(12) United States Patent
Grimme et al.

(10) Patent No.: US 10,248,214 B2
(45) Date of Patent: Apr. 2, 2019

(54) WEARABLE DEVICE FOR WRITING AND DRAWING

(71) Applicant: Lenovo (Singapore) Pte. Ltd., Singapore (SG)

(72) Inventors: Jason Grimme, Cary, NC (US); Rod D. Waltermann, Rougemont, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 276 days.

(21) Appl. No.: 14/091,767

(22) Filed: Nov. 27, 2013

(65) Prior Publication Data
US 2015/0145760 A1    May 28, 2015

(51) Int. Cl.
*G09G 5/00* (2006.01)
*G06F 3/01* (2006.01)
*G06F 3/023* (2006.01)

(52) U.S. Cl.
CPC .............. *G06F 3/017* (2013.01); *G06F 3/011* (2013.01); *G06F 3/0233* (2013.01)

(58) Field of Classification Search
CPC .. G06F 3/044; G06F 3/03545; G06F 12/0815; G06F 2212/621; G06F 8/315; G06F 8/4443; G06F 9/4431; G06F 9/4443; G06F 9/45504; G06F 9/45508; G06F 9/45516; G06F 9/4552; G06F 9/45529; G06F 17/30315; G06F 3/017; G06F 3/014; G06F 1/3234; G06F 1/1626; G06F 21/32; G06F 3/0304; G06F 3/0482; G06F 3/04842; G06F 1/163; G06F 3/0488; G06F 3/012; G06F 3/013; G06F 3/0426
USPC ................ 345/156, 168, 169, 173, 174, 175
See application file for complete search history.

(56) References Cited

U.S. PATENT DOCUMENTS 6,848,083 B2 * 1/2005 Shen ...................... G06F 3/0235
                                                                    341/51
2012/0007713 A1 * 1/2012 Nasiri et al. ................. 340/5.81

* cited by examiner

*Primary Examiner* — Duc Q Dinh
(74) *Attorney, Agent, or Firm* — Ference & Associates LLC

(57) ABSTRACT

An embodiment provides a method, including: detecting, via a wearable information handling device, a user motion; processing, via the wearable information handling device, the user motion into user motion data; determining, using a processor, that the user motion data is handwriting input; and converting, using the processor, the user motion data into a digital handwriting input. Other aspects are described and claimed.

21 Claims, 4 Drawing Sheets

WEARABLE DEVICE FOR WRITING AND DRAWING

BACKGROUND

Information handling devices, e.g., laptops, desktops, tablet computers, wearable devices, etc., ("devices") come in a variety of forms. Increasingly popular are devices that may be used in contexts to supplement or supplant conventional forms of writing. For example, rather than use a traditional whiteboard or chalkboard, smart boards are utilized in an effort to capture writing inputs in a digital form. In this regard, various specialized input devices and/or surfaces have also become popular, e.g., pen and digitizer/touch screen pairs, optical sensors, etc., that allow for rendering and recording of digital handwriting.

Such devices (or combinations of devices) are popular in various contexts. For example, smart boards are increasingly being implemented by education and business communities, whereas digital writing surfaces, e.g., touch screens used with a writing implement such as a finger or pen/stylus, are increasingly being utilized by businesses and even personal users.

BRIEF SUMMARY

In summary, one aspect provides a method, comprising: detecting, via a wearable information handling device, a user motion; processing, via the wearable information handling device, the user motion into user motion data; determining, using a processor, that the user motion data is handwriting input; and converting, using the processor, the user motion data into a digital handwriting input.

Another aspect provides a wearable information handling device, comprising: a sensor; a processor; and a memory device storing instructions executable by the processor to: detect, via the sensor, a user motion; process the user motion into user motion data; determine that the user motion data is handwriting input; and convert the user motion data into a digital handwriting input.

A further aspect provides a program product, comprising: a storage device comprising device readable code, the device readable code comprising: code that detects, via a wearable information handling device, a user motion; code that processes, via the wearable information handling device, the user input into user motion data; code that determines, using a processor, that the user motion data is handwriting input; and computer readable program code configured to convert, using the processor, the user motion data into a digital handwriting input.

A further aspect provides an information handling device, comprising: a receiver; a processor; and a memory device storing instructions executable by the processor to: receive, via the receiver, user motion data derived from a wearable information handling device; and convert the user motion data into a digital handwriting input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
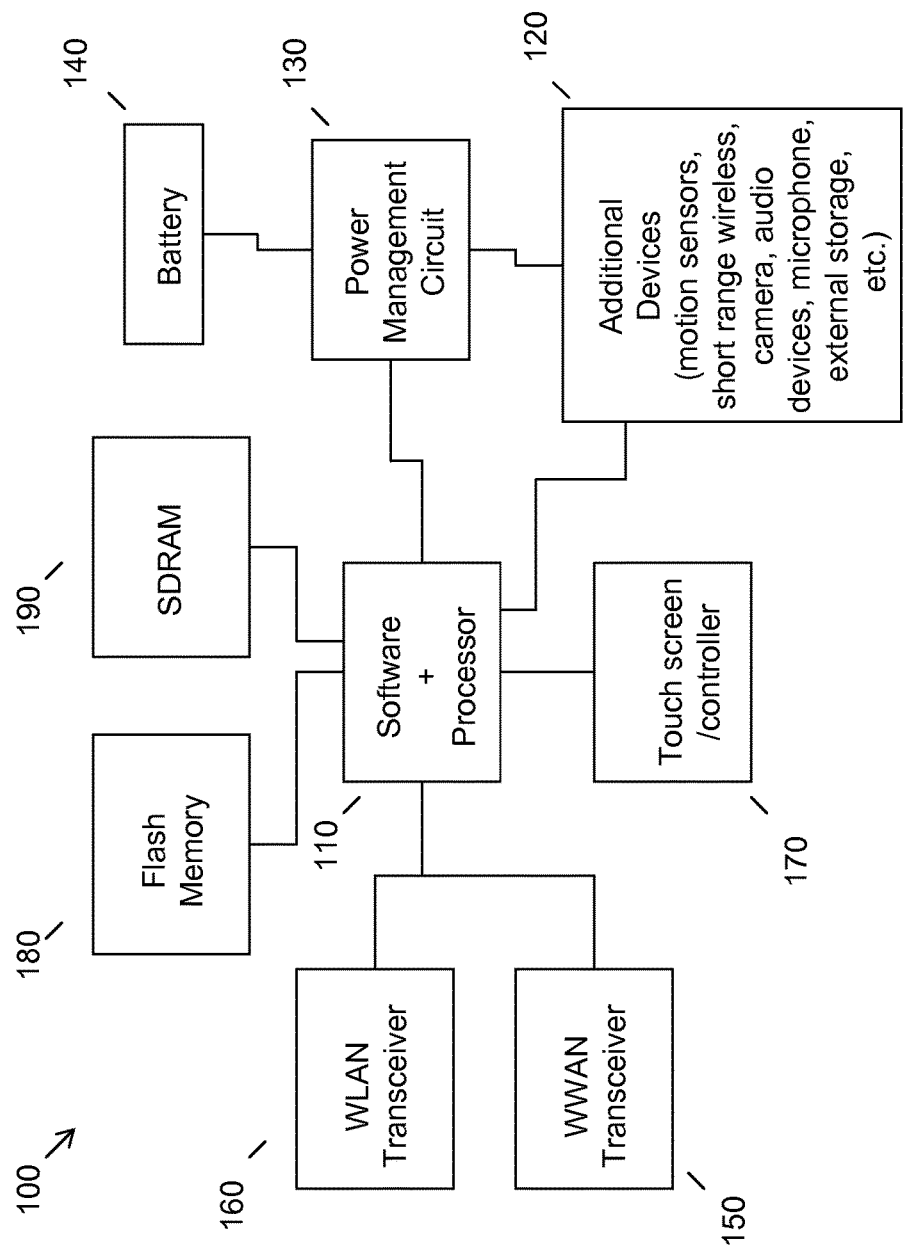
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While digital writing devices are increasingly popular, collection of digital writing/drawing data is time consuming and/or requires a capturing device, such as a camera and software for text extraction. Existing smart writing devices, e.g., smart boards, require a special device and/or special surface. For example, smart surfaces can automatically collect data, but limit the user to only writing on that surface. Digital pens require either specialized surfaces (e.g., touch screen, digitizer, etc.) or (OCR) optical character recognition of input to the surface may be utilized. Thus, each conventional solution tends to set unfortunate boundaries on the user's ability to provide more natural writing or drawing inputs, e.g., limits the users to remaining within a specialized writing surface, limits users to utilizing dedicated pens, specialized surfaces or devices, or the like.

Accordingly, an embodiment provides a wearable device that collects data that has been written/drawn and/or gestured by a user, e.g., via sensing movement of the wearable device and/or by sensing characteristics of the user (e.g., muscle/motor activity of the user of the wearable device). For example, in the case of a user writing on a traditional white board in a meeting, a wearable device according to an embodiment collects the user's motions, (e.g., text motions, drawing motions, muscle activity, various gestures, etc.) that the user provides, e.g., while writing on the traditional white board, for later review or use. In various embodiments, the wearable may analyze the collected data and process it locally and/or may report raw motion data to an analysis point for further processing, e.g., via a cloud device.

The illustrated example embodiments will be best understood by reference to the figures. The following description is intended only by way of example, and simply illustrates certain example embodiments.

While various other circuits, circuitry or components may be utilized in information handling devices, with regard to wearable devices, smart phones and/or tablet circuitry 100, an example illustrated in FIG. 1 includes a system on a chip design found for example in tablet or other mobile computing platforms. Software and processor(s) are combined in a single chip 110. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces for example include SDIO and I2C.

There are power management chip(s) 130, e.g., a battery management unit, BMU, which manage power as supplied for example via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a short range wireless communication device, such as a BLUETOOTH radio, or element(s) that may be used for near field communications. Commonly, system 100 will include a touch screen 170 for data input and display. System 100 also typically includes various memory devices, for example flash memory 180 and SDRAM 190.

Figure 2:
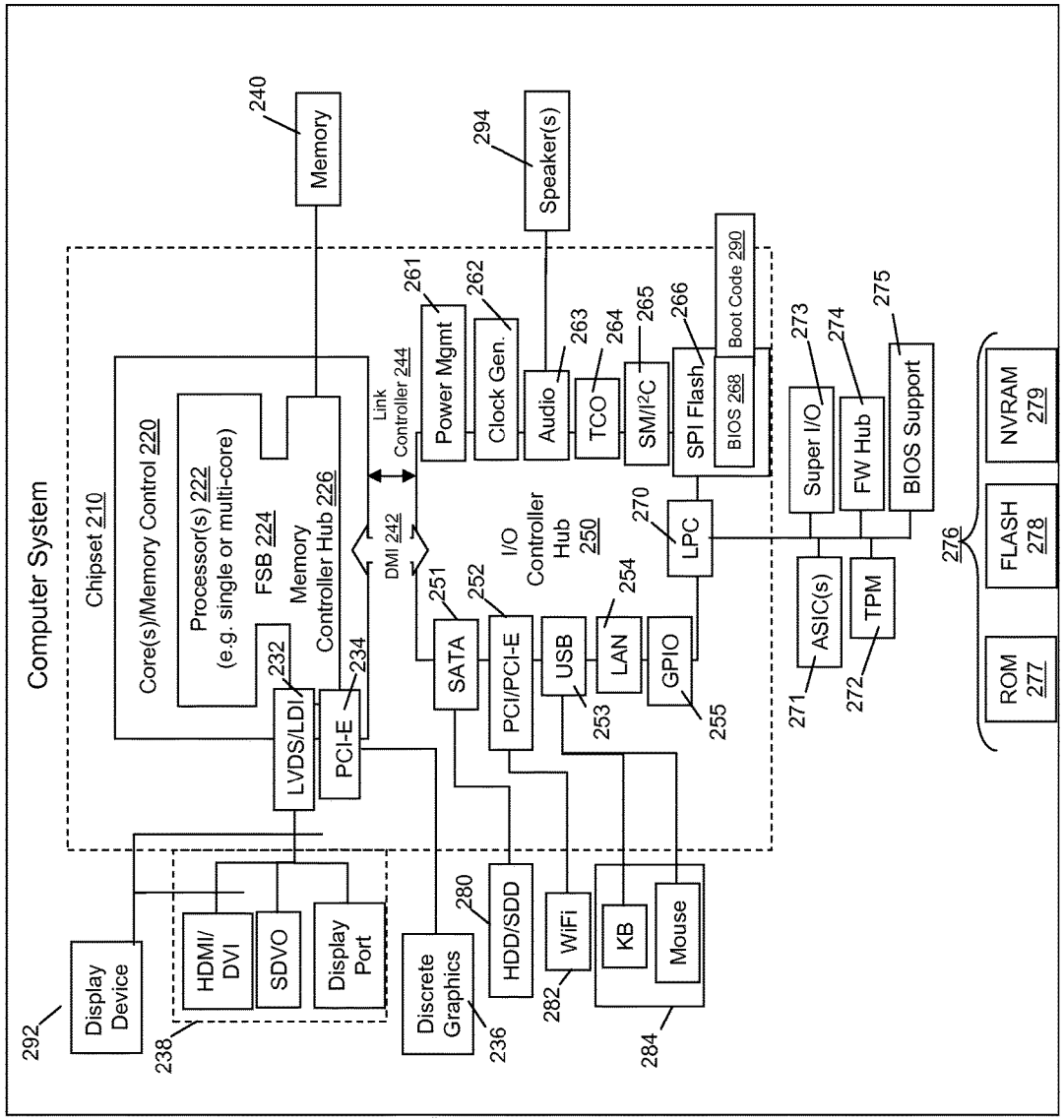
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280 et cetera), a PCI-E interface 252 (for example, for wireless connections 282), a USB interface 253 (for example, for devices 284 such as a digitizer, keyboard, mice, cameras, phones, microphones, storage, other connected devices, et cetera), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be utilized in various devices according to the embodiments described herein. For example, the circuitry outlined in FIG. 1 may be utilized in a wearable device and the circuitry outlined in FIG. 2 may be used in another device in communication with the wearable device, e.g., a cloud based device, a laptop device, a tablet device, etc. For example, a wearable device may include circuitry similar to that outlined in FIG. 1 and communicate, e.g., using a short range wireless device such as BLUETOOTH LE or other communication mechanisms, e.g., a network connection, with other devices, e.g., a local or remote device including circuitry such as outlined in FIG. 2.

Figure 3:
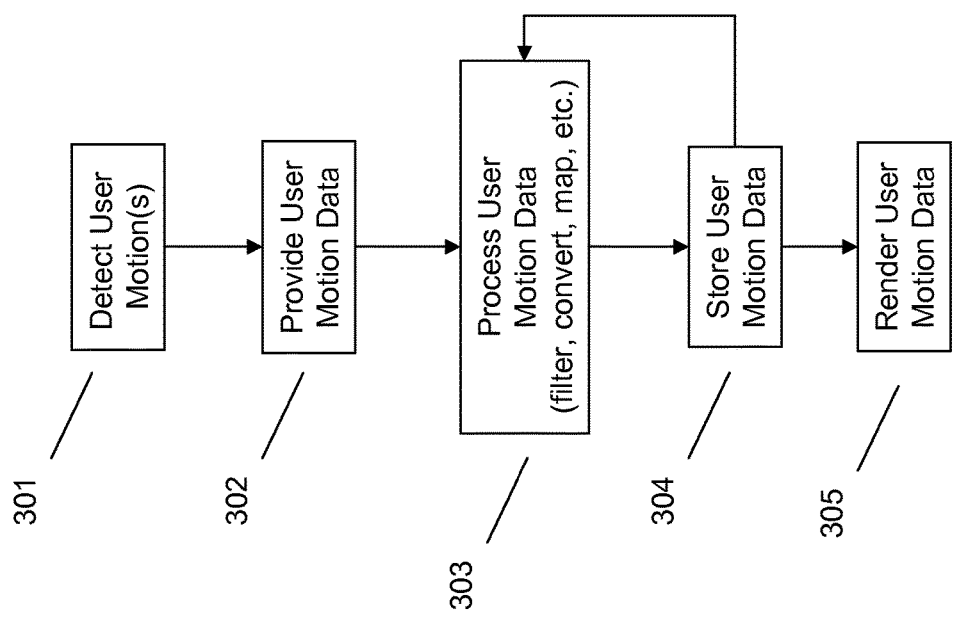
FIG. 3 an example method of using a wearable information handling device for rendering handwriting inputs.

Referring to FIG. 3, in an embodiment, a wearable device (e.g., smart watch, bracelet, glove, etc.) may be worn by a user. The wearable device detects and captures user's motions at 301. These detected motions may be provided at 302, e.g., to a memory device, such that the inputs of the various sensors of the wearable device may be processed at 303 in order to determine various associated inputs, e.g., handwriting and drawing inputs (handwriting and drawing are used interchangeably herein).

For example, the wearable device's accelerometer may detect user motions at 301 as provided by the user, e.g., writing on a traditional whiteboard, a chalk board, a wall, or no particular surface (e.g., writing "in air"). Thus, an embodiment may include a motion sensor in the wearable device such as an accelerometer that detects at 301 and transmits at 302, e.g., to a memory of a wearable device and/or a connected device, e.g., cloud device, the detected motions of the user for further processing and utilization.

An embodiment may detect user writing or drawing motions, gestures and the like at 301 via a variety of mechanisms, either alone or in some combination. For example, an embodiment may utilize an accelerometer in the wearable device to detect motion of the wearable device itself (e.g., spatial coordinate data) and may utilize electrical or optical sensors of the wearable device, e.g., muscle activity sensors, to detect refined motor movements of the user, e.g., hand movements, wrist movements, finger movements, etc. These detected motions/movements may then be collected by an embodiment, e.g., at the wearable device and/or other connected devices, for further analysis, e.g., forming these raw inputs into interpretable user motion data, and further utilization thereof.

Given the detected motions of the user, an embodiment processes, e.g., filters, converts/transforms, maps, the motion at 303 into various predetermined digital data that may be utilized in forming inputs, e.g., writing and drawing inputs for rendering on screen at 305. The processing, e.g., transforming, of the motions into motion data at 303 may take a variety of forms, e.g., depending on the nature, type and/or amount of such data available, its quality, etc.

For example, an embodiment may store all of the received data at 304 and thereafter implement filtering to sort through the motions in order to discard unwanted or unusable data, parse different types of input data into different categories, map predetermined motions into predetermined inputs, e.g., characters, symbols, etc. By way of example, an embodiment may employ certain filtering techniques to discard certain of the stored motion data that does not map to predetermined, known motions (e.g., gestures) or inputs (e.g., handwritten characters or symbols), may filter user motions for which it is not possible to transform the motions into usable motion data, e.g., into a smoothed rendering (e.g., circle, line, symbol, or other drawing) or mapped into a predetermined character (e.g., letter of an alphabet, etc.), or discard user motions sensed by the wearable that conflicts with other data, e.g., previous or subsequent data, etc.

The transformed user motion, i.e., motion data, may be utilized in a variety of ways, e.g., to form digital renderings of handwriting or drawings for on-screen display at 305. The motion data may be stored, e.g., at 304, and later retrieved for various uses. For example, the motion data stored, e.g., at 304, may be used for rendering in a digital format, e.g., on any surface onto which digital data may be displayed. For example, an embodiment may access a store of the motion data and render it on a display screen or monitor, project it as a digital image onto a surface or screen, apply formatting for importation into an application, e.g., word processing application, etc. Moreover, the motion data imported to various applications, e.g., word processing applications, may be further formatted, edited or modified by a user.

In an example, collected motions of a user in the form of spatial coordinate data, e.g., "x", "y" coordinates (or "x", "z" coordinates, if writing vertically, or "x", "y", "z" coordinates for three dimensional writing or gestures, etc.) corresponding to user movements derived from component(s) of the wearable, e.g., accelerometer, muscle activity sensors, etc. These motions are collected and provided at 301 and 302, respectively. These data derived from the motions may then be analyzed or processed at 303 into motion data to detect individual characters or glyphs that were written by the user, e.g., using a traditional marker on a white board. The user has the wearable device on (e.g., wearable in the form of a watch or glove) and thus would not be limited to a particular (or any at all) writing device or surface. Thus, a user need not provide the writing or drawing inputs to a smart surface, such as a smart board.

The wearable device records the motion, e.g., of the user's hand, arm, fingers, etc., which is then analyzed to determine what the user has written. For example, the wearable (or other connected device) may implement an optical character recognition (OCR) like analysis of the motion data stored at 304 to filter out characters movements from drawing strokes, and to parse such positive, intentional inputs, from incidental movements, e.g., the user resting his or her hand, providing gestures during animated speech, etc.

An embodiment may also preserve/store the motion data and/or additional data for later use. For example, a character written, e.g., the letter "A", may also have it's relative location and/or timing information recorded by an embodiment. In this example, the character's relative location information (e.g., with respect to a global or relative reference point) may be used, for example, to map the character to a particular location in a table that the user was filling in, e.g., on a traditional white board. This permits a rendering of the character in a particular table location, e.g., as provided in an underlying application, and moreover allows saving different versions of the table, e.g., if the user later erases the character and/or relocates it within the table.

In this regard, drawing strokes such as lines and circles may be superimposed onto the resulting text to complete the rendering, e.g., the tabular data. For example, this may be done utilizing explicitly drawn inputs of the user (and detected by the wearable) or in an automated fashion, e.g., as part of processing applied at 303 by an embodiment, or as part of post processing, e.g., performed by an underlying application that detects a pattern (e.g., table input) in the transformed motion data, derived from the wearable device, and input sequentially into the underlying application.

Figure 4:
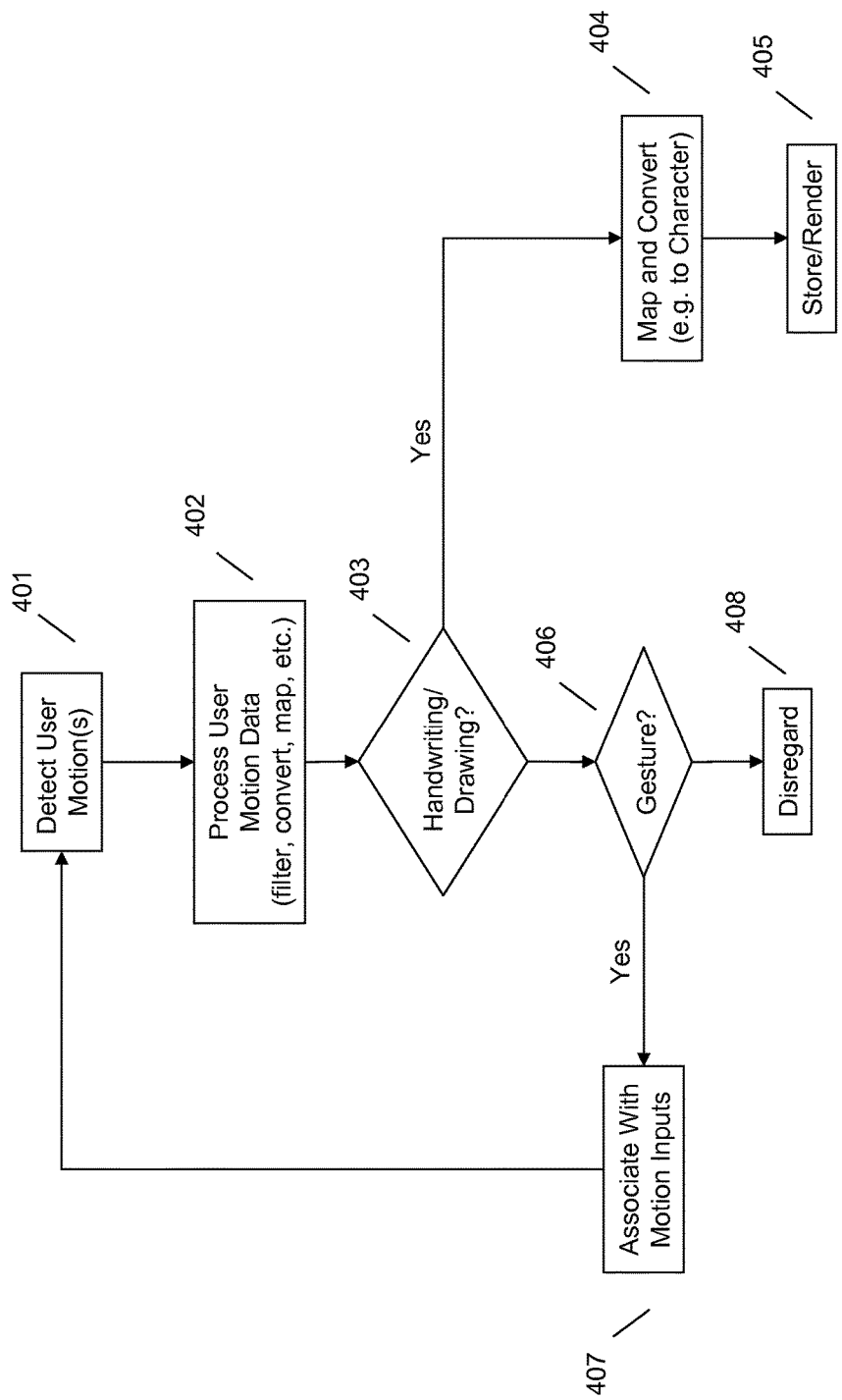
FIG. 4 illustrates an example method of processing user motions inputs derived from a wearable information handling device.

Turning to FIG. 4, motions not characteristic of writing or drawing (such as pausing to think with hands resting at the user's side, reaching for a different colored pen, etc.) may be distinguished by an embodiment, e.g., as part of the filtering or processing. For example, on detecting a user motion at 401, an embodiment may process the user motion data thus detected at 402 in an attempt to analyze if the user motion is in fact handwriting/drawing input to form a rendering, if it is gesture input that may be associated with other handwriting/drawing input, or if it is other motion entirely.

For example, an embodiment may process the user motion data derived via the wearable device to determine at 403 if it is handwriting input, e.g., maps to a character or symbol. If so, such motion may in fact be further processed, e.g., mapped to the underlying character, e.g., with possible conversion to machine text character, at 404 and thereafter stored and/or rendered at 405.

However, such motions may be discarded or treated as gestures handled in a reactive manner, as illustrated in FIG. 4. Thus, if the user motion is not a handwriting/drawing gesture as determined at 403, e.g., a user grabs a different colored pen, as determined at 404, the gesture may be associated with other handwriting inputs, e.g., as illustrated at 407. For example, upon determining the change of pen gesture, the text being written thereafter could be tagged with a different color at that time, e.g., as determined via detecting the pen change gesture. This information may be utilized in a variety of ways, e.g., to allow other/associated input renderings in a different color, used in combination with timing information to form versions of the writing input, etc. If the detected motions of the wearable device are not determined to be handwriting or other usable gesture input, an embodiment may disregard/discard the data input via the wearable device at 408 and continue to await further motions for analysis.

An embodiment may detect gestures, e.g., at 406, in a variety of ways. In the example of a pen change gesture, an embodiment will have input data in the form of motion input data from the wearable device. An embodiment may map this data alone at 406 to a known gesture, e.g., picking up a writing implement. However, this data may be supplemented with other data or other data may be used alone, e.g., as detected by the wearable device. For example, near field communication between the wearable device and the new pen, via an on board camera of the wearable device, via an additional camera in communication with the wearable device or other linked system component, etc., may be utilized to determine the user has picked up a different writing implement.

A variety of such additional gestures may be detected, including but not limited to the act of erasing, a user "flipping" a page or initiating another version of the drawing input, etc. Therefore, an embodiment may utilize such information to form the collected data into frames or versions in a timeline that are saved separately, e.g., to permit a user to later see the state of the input data as it was at a particular stage. This helps to clarify overwrites, corrections, or highlights, without losing potentially important data that is removed, e.g., via erasing gestures.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, via a muscle activity sensor of a wearable information handling device worn by a user, a user motion, wherein the user motion comprises a motor movement of the user irrespective of movement of the wearable information handling device;
   detecting, via a sensor different from the muscle activity sensor, motion of the wearable information handling device;
   processing, via the wearable information handling device, the user motion and the motion of the wearable information handling device into user motion data;
   determining, using a processor, that the user motion data is handwriting input; and
   converting, using the processor, the user motion data into a digital handwriting input.

2. The method of claim 1, further comprising rendering, on a display, the digital handwriting input.

3. The method of claim 1, further comprising importing the digital handwriting input into an underlying application.

4. The method of claim 1, wherein the detecting comprises detecting spatial location coordinates of the motion of the wearable information handling device.

5. The method of claim 4, wherein the detecting comprises detecting a time associated with the motion of the wearable information handling device.

6. The method of claim 5, further comprising saving different versions of the user motion data having similar spatial coordinates and different times.

7. The method of claim 1, further comprising determining a time associated with the user motion data detected; and
   saving different versions of the user motion having different times.

8. The method of claim 1, further comprising determining that the user motion data is a gesture.

9. The method of claim 8, further comprising associating the gesture with other user motion data.

10. The method of claim 9, further comprising modifying the other user motion data based on the gesture.

11. A wearable information handling device, comprising:
a muscle activity sensor;
a sensor different from the muscle activity sensor;
a processor; and
a memory device storing instructions executable by the processor to:
detect, via the muscle activity sensor of the wearable information handling device worn by a user, a user motion, wherein the user motion comprises a motor movement of the user irrespective of movement of the wearable information handling device;
detect, via the sensor, motion of the information handling device;
process the user motion and the motion of the wearable information handling device into user motion data;
determine that the user motion data is handwriting input; and
convert the user motion data into a digital handwriting input.

12. The information handling device of claim 11, further comprising a display and wherein the instructions are further executable by the processor to render, on the display, the digital handwriting input.

13. The information handling device of claim 11, wherein the instructions are further executable by the processor to import the digital handwriting input into an underlying application.

14. The information handling device of claim 11, wherein to detect comprises detecting spatial location coordinates of the motion of the wearable information handling device.

15. The information handling device of claim 14, wherein to detect comprises detecting a time associated with the motion of the wearable information handling device.

16. The information handling device of claim 15, wherein the instructions are further executable by the processor to save different versions of the user motion data having similar spatial coordinates and different times.

17. The information handling device of claim 11, wherein the instructions are further executable by the processor to determine a time associated with the user motion detected; and
save different versions of the user motion data having different times.

18. The information handling device of claim 11, wherein the instructions are further executable by the processor to determine that the user motion data is a gesture.

19. The information handling device of claim 18 wherein the instructions are further executable by the processor to:
associate the gesture with other user motion data; and
modify the other user motion data based on the gesture.

20. A program product, comprising:
a storage device comprising device readable code, the device readable code comprising:
code that detects, via a muscle activity sensor of a wearable information handling device worn by a user, a user motion, wherein the user motion comprises a motor movement of the user irrespective of movement of the wearable information handling device;
code that detects, via a sensor different from the muscle activity sensor, motion of the wearable information handling device;
code that processes, via the wearable information handling device, the user motion and the motion of the wearable information handling device into user motion data;
code that determines, using a processor, that the user motion data is handwriting input; and
code that converts the user motion data into a digital handwriting input.

21. An information handling device, comprising:
a receiver;
a processor; and
a memory device storing instructions executable by the processor to:
receive, via the receiver, user motion data derived from a muscle activity sensor of a wearable information handling device worn by a user, wherein the user motion data comprises motor movement data of the user irrespective of movement of the wearable information handling device;
receive, via the receiver, wearable information handling device motion data derived from a sensor different from the muscle activity sensor of the wearable information handling device; and
convert the user motion data and the wearable information handling device motion data into a digital handwriting input.

* * * * *